Patented Sept. 24, 1929

1,729,428

UNITED STATES PATENT OFFICE

WILLIAM L. LAWSON, OF BILLINGS, MONTANA

PRODUCING ALKALI-EARTH METAL OXIDES

No Drawing.   Application filed October 8, 1927.   Serial No. 225,040.

This invention relates to the production of oxides of alkali-earth metals, and has for its object the provision of an improved method of producing alkali-earth metal oxides from their carbonates, such, for example, as the production of barium oxide from barium carbonate. More specifically, the invention contemplates an improved method of regenerating barium oxide from the barium carbonate sludges produced in the barium processes of sugar extraction.

Barium carbonate yields carbon dioxide only at very high temperatures; prolonged heating around 2700° F. being required for complete decomposition. In commercial practice, electric arc furnaces are now being used for the conversion of barium carbonate to barium oxide, and with temperatures of from 2800 to 3000° F. about four hours are required for economic conversion of the carbonate. Many proposals have heretofore been made for effecting the economic conversion of barium carbonate to barium oxide at lower temperatures, but so far as I am aware no one of these proposals has proven of practical value.

My present invention is based on the discovery that in the presence of an appropriate catalytic agent barium carbonate may be effectively converted to barium oxide at temperatures substantially lower than 2800° F. As the catalytic agent I have found petroleum coke particularly suitable, although other forms of carbon such as graphite, coke, bone black, lamp black, carbon black, etc., may be used. It is a characteristic feature of the invention that the catalytic agent functions as a pure catalyst and is not consumed or dissipated in the course of the conversion process. Where the catalytic agent is of such a nature that it would normally be consumed, in part at least, in the course of the conversion process, appropriate precautions are taken in carrying out the operation to inhibit any substantial consumption of the catalytic agent.

My present invention, in its broad aspect, therefore involves the production of oxides of alkali-earth metals, such as barium, strontium and calcium, by subjecting a mixture of the carbonate of the alkali-earth metal and a catalytic agent in a closed vessel to a sufficiently high temperature, not exceeding 2800° F., for effecting ready decomposition of the carbonate with the evolution of carbon dioxide under conditions inhibiting any substantial consumption of the catalytic agent. The evolved gases are withdrawn from the vessel as the reaction proceeds, and the resulting reaction product is cooled under conditions inhibiting any deleterious changes therein. While strontium and calcium carbonates may be converted to their respective oxides at substantially lower temperatures than required for the conversion of barium carbonate, nevertheless the application of the principles of the invention to the conversion of strontium and calcium carbonates promotes the reaction usually in the direction of permitting the use of lower temperatures than would otherwise be possible, and/or of increasing the rate of gas evolution.

In carrying out the invention for the production of barium oxide from barium carbonate, I now preferably employ petroleum coke as the catalytic agent. In accordance with my preferred practice, the barium carbonate is intimately mixed with about 20% by weight of the coke. The mixture is then subjected in a closed vessel to a temperature of from 1200° F. to 2800° F. In actual practice, I have found a temperature of about 2000° F. very satisfactory. The vessel is provided with means for permitting the withdrawal of the evolved gases, and in my preferred practice these gases are withdrawn at such a rate that the gas pressure within the vessel is maintained well below the atmospheric pressure. When satisfactory conversion of the carbonate to oxide has been accomplished, the resulting reaction product in the vessel is cooled under conditions inhibiting any oxidation thereof. To this end, the vessel may be sealed and the reaction product cooled in its own atmosphere and without access of air.

The reaction product when cooled will consist of barium oxide admixed with the catalytic agent. Under favorable conditions substantially complete conversion of the carbonate to oxide will be effected. When desired, the catalytic agent may be separated from the reaction product, leaving substantially pure barium oxide. In many instances, however, the presence of the catalytic agent in the reaction product is unobjectionable and no separation is necessary.

The following examples will illustrate the application of the invention to actual practice.

A. Substantially pure dry barium carbonate, through a 100 mesh sieve, was mixed with 20% by weight of petroleum coke, also through a 100 mesh sieve. The mixture was introduced into an externally heated rotatable retort. The retort was rotated at about 9 R. P. M. The reaction mixture was heated to 1850° F. for the first twenty minutes, 1910° F. for the next hour and five minutes, and 2025° F. for the next forty minutes. The retort was maintained under a reduced pressure during the entire heating operation. This was accomplished by operatively connecting the gas outlet of the retort to a vacuum producing device, which was operated so as to maintain a vacuum of from 11 to 23 inches within the retort during the heating operation. The reaction product was cooled in the retort without access of air to a sufficiently low temperature to prevent ignition of the carbon. A conversion of 99% was effected. The petroleum coke remained unchanged in amount and character.

B. In this example, substantially pure barium carbonate was briquetted with petroleum coke, water being used to effect the necessary plasticity for briquetting. The same proportions of carbonate and coke were used and the same apparatus as in the preceding example. The retort rotated at 9 R. P. M., and the charge was heated for the first thirty minutes to a temperature of 1970° F. and for the next hour to a temperature of 1970 to 2025° F. A vacuum of from 17 to 22 inches was maintained within the retort. The resulting reaction product was cooled under non-oxidizing conditions. Substantially 100% conversion of the carbonate to barium oxide was effected, while the coke was neither consumed nor changed.

Various forms of apparatus may be employed in the practice of the invention. Ordinarily, it will be found advantageous to provide an apparatus in which preheating, conversion and cooling may be progressively carried out. To this end, the apparatus may conveniently take the form of a continuously operating retort or furnace, such as a rotating tube or traveling hearth furnace, through which the mixture in process is continuously passed, being preheated in the entrance or early stage of the apparatus, heated to the conversion temperature in the central portion of the apparatus, and cooled in the last section of the apparatus. The retort or chamber in which the reaction mixture is treated should be constructed of heat-resistant material that is unaffected by the products of the conversion and by the heating means. Alloys of chromium and nickel, with or without iron, may advantageously be used for the reaction chamber or retort. The apparatus may be heated in any appropriate manner, as by hot combustion gases, by electricity, etc.

The gas evolved during the conversion process consists for the most part of carbon dioxide. Substantially no carbon monoxide is evolved, thereby demonstrating the chemical inactivity of coke when used as the catalytic agent. The evolved carbon dioxide gas may be appropriately collected and used in ways well known to the art.

While I have hereinbefore described the broad principles of my invention, the technical application of those principles to the sugar extraction industry is of fundamental importance. In the so-called barium processes of sugar extraction, barium oxide or hydrate is used in certain stages of the extraction process for precipitating the sugar as an insoluble monosaccharate of barium. In subsequent stages of the process, this insoluble sugar precipitate is subjected to the action of carbon dioxide whereupon the sugar again goes into solution and barium carbonate is precipitated. To render the process in its entirety cyclic, the barium carbonate precipitate must be treated to regenerate barium oxide, but the expense of this regeneration step has greatly retarded the commercial adoption of the otherwise satisfactory barium processes.

In accordance with my present invention the barium carbonate sludges formed in sugar extraction are heated in the presence of an appropriate catalyst, such as carbon, to a sufficiently high temperature, not exceeding 2800° F., for effectively converting the barium carbonate to barium oxide. This conversion is conducted under conditions that inhibit any consumption of the catalyst. Thus, where carbon is the catalyst a vacuum of sufficient degree is maintained within the reaction chamber so that no change in the catalytic carbon takes place. The resulting regenerated barium oxide may be directly returned to the sugar extraction process without removal or separation of the catalytic agent.

When applied to the regeneration of barium oxide in the sugar industry, the use of carbon as the catalyst is of particular advantage. Carbon, more particularly vegetable carbon, is now extensively used in sugar extraction processes, not only for its purifying effects but on account of the granular quality it imparts to the sludges or cakes in filtering operations. For this reason, the presence of carbon in the regenerated barium oxide is of distinct advantage in sugar extraction processes.

The barium carbonate sludges obtained in sugar extraction processes always contain organic matter derived from the sugar juices. In the practice of my present invention, this organic matter is carbonized in the regeneration of the barium oxide, thereby providing additional carbon which acts as a catalyst in the regeneration stage and provides useful carbon when subsequently introduced into the sugar extraction process. It will therefore be seen that the process of my invention applied to the sugar industry is truly cyclic, in that both the barium and the carbon catalyst are continuously in circuit, and the only losses are those that inevitably occur in cyclic processes.

I claim:

1. The method of producing oxides of alkali-earth metals which comprises subjecting a mixture of the carbonate of an alkali-earth metal and a carbon catalyst in a closed vessel to a sufficiently high temperature not exceeding 2800° F. to effect ready decomposition of the carbonate with the evolution of carbon dioxide under conditions inhibiting any substantial consumption of the carbon catalyst, withdrawing the evolved gases from the vessel, and cooling the resulting reaction product under conditions substantially inhibiting oxidation of the carbon catalyst.

2. The method of producing oxides of alkali-earth metals which comprises subjecting a mixture of the carbonate of an alkali-earth metal and a carbon catalyst to a temperature of from 1200 to 2800° F. in a closed vessel, withdrawing the evolved gases from the vessel at such a rate that a gas pressure substantially lower than atmospheric pressure is maintained within the vessel, and cooling the resulting reaction product under conditions substantially inhibiting oxidation of the carbon catalyst.

3. The method of producing oxides of alkali-earth metals which comprises subjecting a mixture of the carbonate of an alkali-earth metal and petroleum coke in a closed vessel to a sufficiently high temperature not exceeding 2800° F. to effect ready decomposition of the carbonate with the evolution of carbon dioxide under conditions inhibiting any substantial consumption of the petroleum coke, withdrawing the evolved gases from the vessel, and cooling the resulting reaction product under conditions substantially inhibiting oxidation of the petroleum coke.

4. The method of producing barium oxide from barium carbonate which comprises subjecting a mixture containing barium carbonate and carbon to a temperature of from 1200 to 2800° F. in a closed vessel under conditions inhibiting any substantial consumption of the carbon, withdrawing the evolved gases from the vessel, and cooling the resulting reaction product under conditions substantially inhibiting oxidation of the carbon therein.

5. The method of producing barium oxide from barium carbonate which comprises subjecting a mixture containing barium carbonate and petroleum coke to a temperature of from 1200 to 2800° F. in a closed vessel under conditions inhibiting any substantial consumption of the petroleum coke whereby the coke acts to promote the reaction by catalysis, withdrawing the evolved gases from the vessel, and cooling the resulting reaction product under conditions substantially inhibiting oxidation of the petroleum coke therein.

6. The method of producing barium oxide from barium carbonate which comprises subjecting a mixture containing barium carbonate and petroleum coke to a temperature of from 1200 to 2800° F. in a closed vessel, withdrawing the evolved gases from the vessel at such a rate that a gas pressure substantially lower than atmospheric pressure is maintained within the vessel whereby the petroleum coke is unconsumed and acts to promote the reaction by catalysis, and cooling the resulting reaction product under conditions substantially inhibiting oxidation of the petroleum coke therein.

7. In the barium processes of sugar extraction, the improvement in the regeneration of barium oxide which comprises subjecting the barium carbonate sludges obtained in the extraction process to a calcination operation in a closed vessel in the presence of catalytic carbon under conditions inhibiting any substantial consumption of the carbon and at temperatures substantially lower than necessary in the absence of the carbon, withdrawing the evolved gases from the vessel, and returning the product of said calcination operation containing the regenerated barium oxide and catalytic carbon to the sugar extraction process.

8. In the barium processes of sugar extraction, the improvement in the regeneration of barium oxide which comprises subjecting the barium carbonate sludges obtained in the extraction process to a calcination operation in a closed vessel in the presence of catalytic carbon under conditions inhibiting any substantial consumption of the carbon and at temperatures substantially lower than necessary in the absence of the carbon, withdrawing the evolved gases from the vessel at such a rate that a gas pressure substantially lower than atmospheric pressure is maintained within the vessel, cooling the resulting reaction product under substantially non-oxidizing conditions, and returning said reaction product containing the regenerated barium oxide and catalytic carbon to the sugar extraction process.

9. In the barium processes of sugar extraction, the improvement in the regeneration of barium oxide which comprises subjecting the barium carbonate sludges obtained in the extraction process to a calcination operation in a closed vessel in the presence of petroleum coke, withdrawing the evolved gases from the vessel at such a rate that a gas pressure substantially lower than atmospheric pressure is maintained within the vessel whereby the petroleum coke is unconsumed and acts to promote the calcination by catalysis, cooling the resulting reaction product under conditions substantially inhibiting oxidation of the petroleum coke therein, and returning said reaction product containing the regenerated barium oxide and petroleum coke to the sugar extraction process.

In testimony whereof I affix my signature.

WILLIAM L. LAWSON.